United States Patent

Minase

[11] Patent Number: 5,307,224
[45] Date of Patent: Apr. 26, 1994

[54] MAGNETIC DISK STORAGE UNIT WITH MAGNETIC HEAD SEPARATING MECHANISM FOR SEPARATING FLOAT TYPE MAGNETIC HEAD FROM MAGNETIC DISK

[75] Inventor: Minoru Minase, Tokorozawa, Japan

[73] Assignee: Teac Corporation, Tokyo, Japan

[21] Appl. No.: 784,370

[22] Filed: Oct. 29, 1991

[30] Foreign Application Priority Data

Oct. 30, 1990 [JP] Japan .................................. 2-293442

[51] Int. Cl.⁵ .............................................. G11B 5/54
[52] U.S. Cl. ....................................... 360/105; 360/25
[58] Field of Search ............................ 360/105, 75

[56] References Cited

U.S. PATENT DOCUMENTS

| | | | |
|---|---|---|---|
| 4,605,979 | 8/1986 | Inoue et al. | 360/105 |
| 5,023,737 | 6/1991 | Yaeger | 360/105 |
| 5,060,099 | 10/1991 | Yaeger | 360/105 |
| 5,079,652 | 1/1992 | Ishida et al. | 360/105 |
| 5,184,263 | 2/1993 | Fukakusa | 360/105 |

*Primary Examiner*—Edward P. Westin
*Assistant Examiner*—Andrew Sanders
*Attorney, Agent, or Firm*—Michael N. Meller

[57] ABSTRACT

A disk storage unit according to the present invention has a head driving member for driving a float type head so that a head can be separated from a disk while the disk stops rotating and approached to the disk when the disk starts to rotate, and a head driving mechanism for driving the head driving member. Incidentally, the head driving mechanism may be made of shape memory alloy or piezoceramic.

12 Claims, 5 Drawing Sheets

MAGNETIC DISK STORAGE UNIT WITH MAGNETIC HEAD SEPARATING MECHANISM FOR SEPARATING FLOAT TYPE MAGNETIC HEAD FROM MAGNETIC DISK

BACKGROUND OF THE INVENTION

The present invention relates generally to magnetic disk storage units, and more particularly to a magnetic disk storage unit with a magnetic head separating mechanism for separating a float type magnetic head from a magnetic disk.

In a conventional magnetic disk storage unit using a contact start and stop (abbreviated CSS hereafter) method, a float type magnetic head contacts a magnetic disk while the disk stops rotating, and floats therefrom by 0.4 to 0.5 $\mu$m to write data thereon and/or read data therefrom as it rotates at a high speed of about 3000 to 3500 rpm and generates an air flow. However, this type of magnetic disk storage unit has the following disadvantages:

1. The disk in the disk storage unit under high temperature and high humid cannot be rotated because of an adhesion phenomenon which strikingly increases a coefficient of static friction.
2. Since a bulky and heavy spindle motor for rotating the disk with a large amount of torque against the static friction force is needed to start rotating the disk, the disk storage unit cannot be miniaturized and made light. In addition, such a motor makes the disk storage unit consume a large amount of power.
3. Since the disk rotates while contacting the head, until its rotating speed is high enough to create the air flow, the disk gets damaged because of a head crashing phenomenon related to dust, located between the disk and head, which scratches the disk and destroys data stored on it.
4. If a sensorless spindle motor which often inversely rotates during starting time is used, the head crashing phenomenon easily occurs.

Accordingly, a disk storage unit having either a cramping mechanism or a solenoid mechanism which respectively separates the head from the disk while the disk stops has been proposed, for example, by U.S. Pat. No. 4,933,785.

However, the above cramping mechanism proposed by U.S. Pat. No. 4,933,785 has a disadvantage in that the head often shakes because of a loose-jointed connecting part of the cramping mechanism; thus an edge of the head damages the disk when the head lands on the disk. Respectively, the above solenoid mechanism has disadvantages in that the solenoid generally actuates so quickly that each component of the head is impacted thus shortening the life of the head. If a damper mechanism or electrical feed back mechanism for absorbing impacts is provided, the disk storage unit is prevented from being simply constructed, miniaturized, and being made light and inexpensive.

SUMMARY OF THE INVENTION

Accordingly, it is a general object of the present invention to provide a novel and useful magnetic disk storage unit in which the above disadvantages are eliminated.

Another object of the present invention is to provide a relatively miniaturized, light, inexpensive, and low power-comsumption magnetic disk storage unit in which a head never damages a disk and destroys data stored thereon.

A more specific object of the present invention is to provide a disk storage unit having a miniature spindle motor for rotating the disk while providing only a small torque.

Another object of the present invention is to provide a magnetic disk storage unit in which a head is separated from a disk, when the disk stops, in order to lessen friction therebetween generated while the disk is rotated and prevent the head crashing phenomenon.

Another object of the present invention is to provide a magnetic disk storage unit in which, even if the sensorless spindle motor is used, which inversely rotates, the head crashing phenomenon never occurs.

Another object of the present invention is to provide a magnetic disk storage unit in which the head never shakes and thus its edge never damages the disk when the head lands on the disk.

Another object of the present invention is to provide a magnetic disk storage unit in which the head slowly and smoothly separates from the disk, so as not to impact each component thereof, and so as to achieve a long life thereof.

Another object of the present invention is to provide a miniature, light, and inexpensive magnetic disk storage unit without a complicated damper mechanism.

According to the present invention, the disk storage unit comprises a head driving member for driving a head so that the head is separated from a disk while the disk stops rotating, and is made to approach the disk when the disk starts to rotate, and a head driving mechanism for driving the head driving member. Therefore, friction between the head and the disk generated when the disk starts to rotate, is made to be small, or zero. Moreover, the head driving mechanism may include a shape memory alloy or piezoceramic driving means for moving the head slowly.

Other objects and further features of the present invention will become apparent from the detailed description when read in conjunction with the accompanying drawings.

DETAILED DESCRIPTION OF THE PREFERRED EMBODIMENTS

Figure 1:
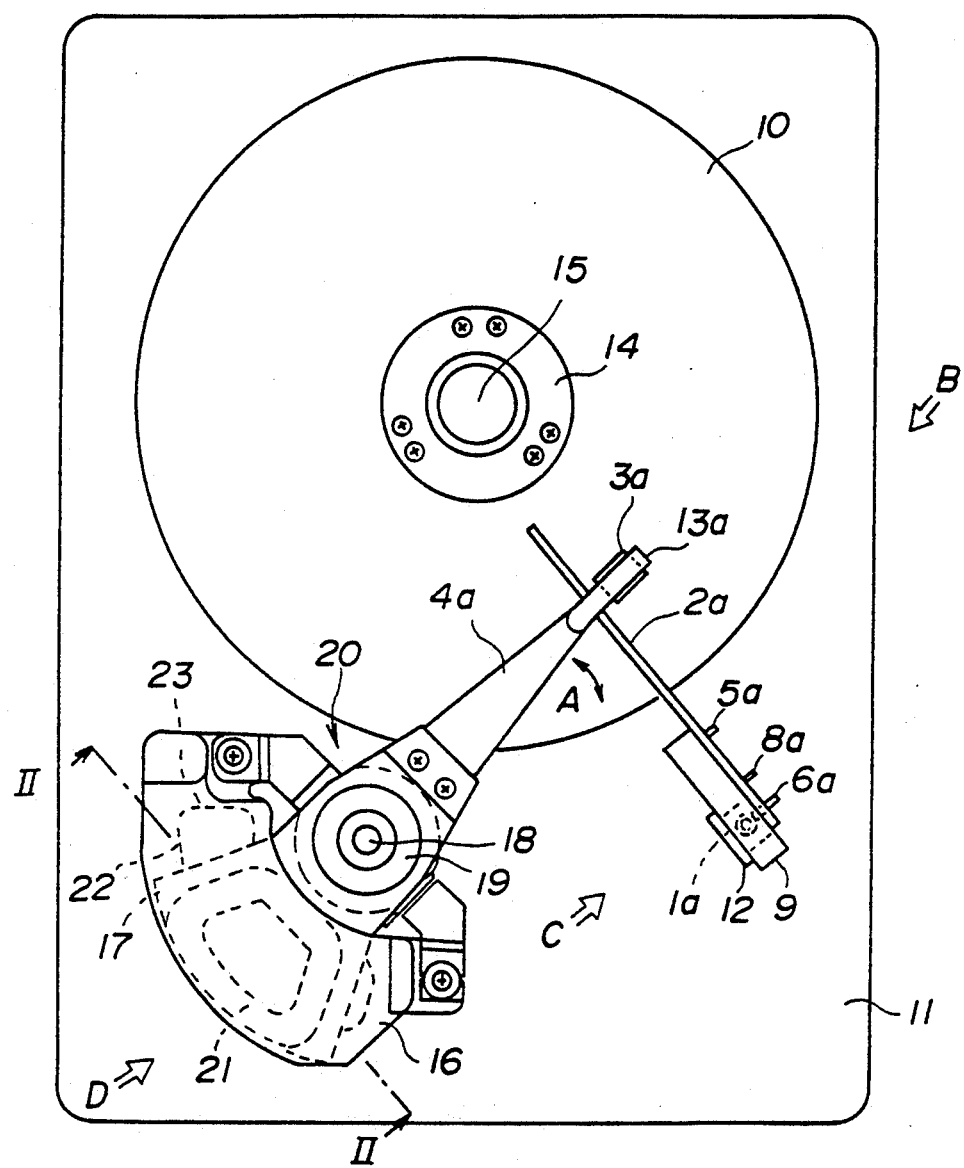
FIG. 1 shows an internal plane view of a magnetic disk storage unit according to the present invention.

FIG. 1 shows an internal plane view of a magnetic disk storage unit according to the present invention. The magnetic disk storage unit comprises a housing 11, a spindle motor 15, fixed in the housing 11, for functioning as disk driving means, a clamper 14 for fixing a magnetic disk 10 on the spindle motor 15, heads 3a and 3b for writing data on the disk 10 and reading data therefrom, and an actuator 20 for moving the heads 3a and 3b in a radial direction A of the disk 10. A description will now be given of the structure of the actuator 20 with reference to FIGS. 1 and 2.

Figure 2:
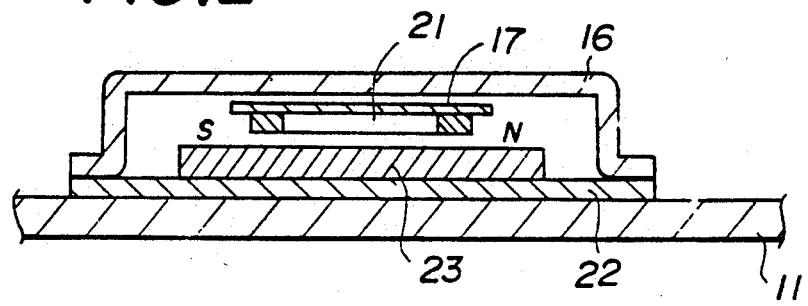
FIG. 2 shows a partial longitudinal section taken along a line II—II shown in FIG. 1.

The actuator 20 comprises an arm 17 pivotally supported on a shaft 18 fixed on the housing 11, and a bearing 19 around the shaft 18. One end of the arm 17 is screwed onto the gimbal 4a. A head shell 13a is provided at the top end of the gimbal 4a, parallel to a disk surface. The head 3a is provided at the top of the head shell 13a. Following is a description of a driving part of the actuator 20 with reference to FIG. 2. FIG. 2 shows the driving part of the actuator 20 viewed from an arrow D shown in FIG. 1. The actuator 20 has an permanent magnet 23, at a side of the driving means, fixed on an upper surface of the lower yoke 22 mounted on the housing 11. Incidentally, the permanent magnet 23 is magnetized so that both ends expose different magnetic poles. The upper yoke 16, the lower yoke 22, and the permanent magnet 23 constitute a magnetic circuit. A driving coil 21, provided in a horizontal direction so as to be opposite the permanent magnet 23 in the vicinity thereof, is mounted on the lower surface of the arm 17 at the back end part. The driving coil 21 is inserted into the space of the magnetic circuit constructed by the upper yoke 16 and the permanent magnet 23. When the driving coil 21 is electrified, the rotating force around it is generated in accordance with Fleming's left hand rule. Thus, the arm 17 rotates in the direction A and the head 3a at the top end of the arm 17 moves on the disk 10.

Figure 3:
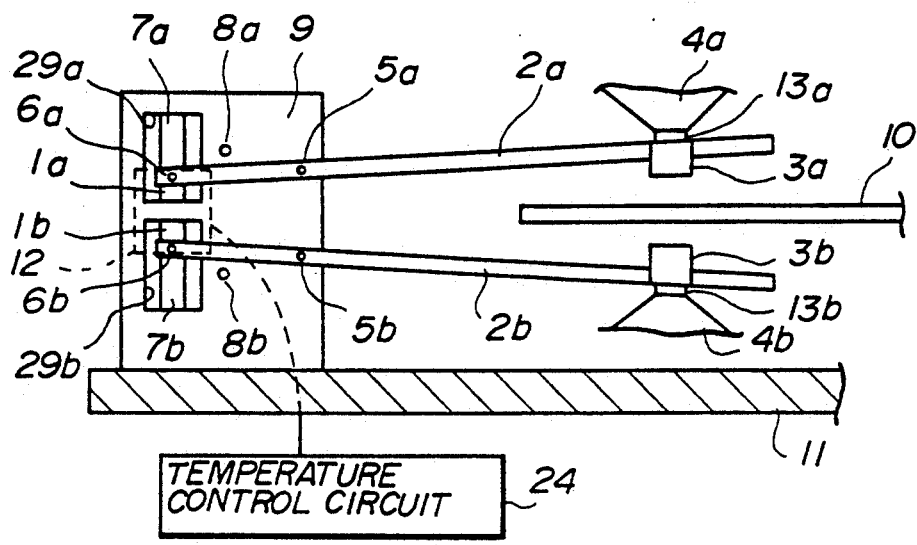
FIG. 3 shows a side view of an actuating magnetic head separating mechanism of a first embodiment of the magnetic disk storage unit shown in FIG. 1.
Figure 4:
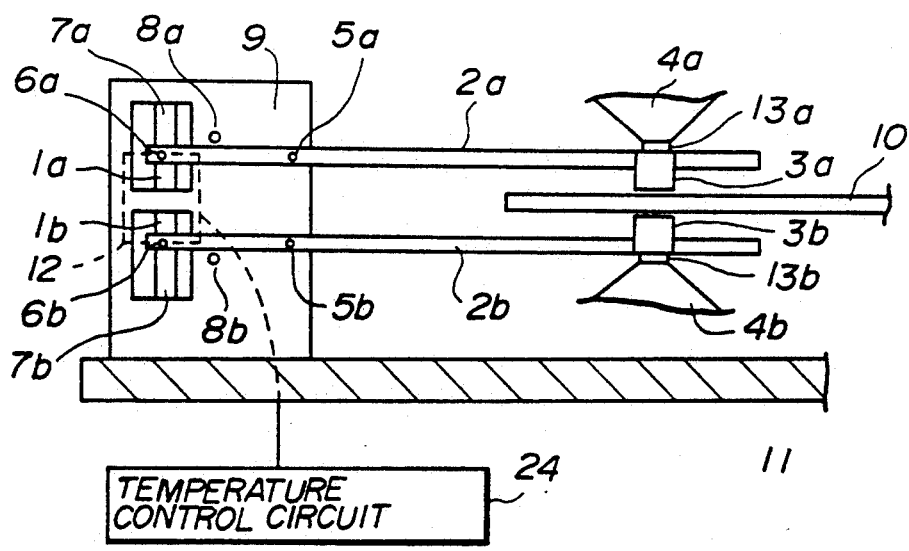
FIG. 4 shows a side view of the non-actuating magnetic head separating mechanism shown in FIG. 3.
Figure 5:
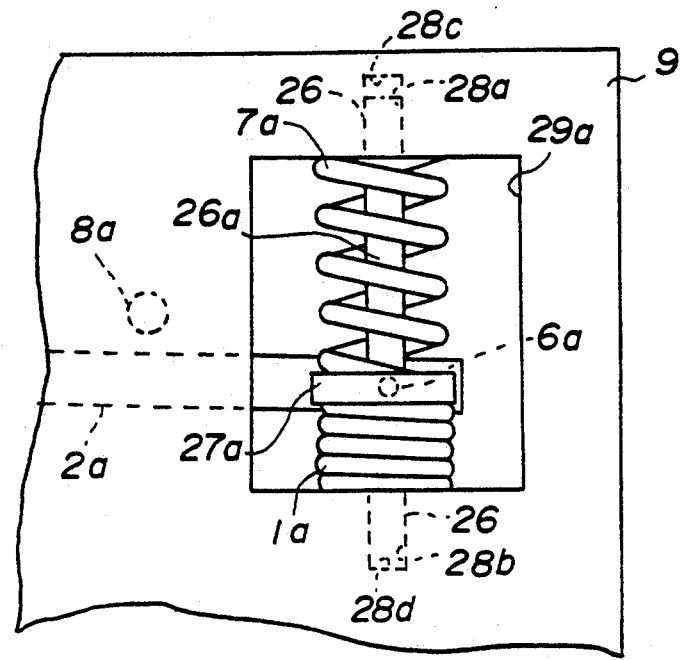
FIG. 5 shows a side view of actuating driving means of the magnetic head separating mechanism shown in FIG. 3.

A description will now be given of the magnetic head separating mechanism of the head driving mechanism with reference to FIGS. 3 through 6. FIGS. 3 and 4 show views of the disk storage unit viewed from a direction B, shown in FIG. 1. FIG. 3 shows heads 3a and 3b separate from the disk 10. In this case, separating arms 2a and 2b of the head driving member compress the head shells 13a and 13b so as to drive them. Thus, the elastic gimbals 4a and 4b are elastically deformed and the heads 3a and 3b separate from the disk 10. FIG. 5 shows a view in which the driving parts of the separating arms 2a and 2b are enlarged in a direction C shown in FIG. 1.

Figure 6:
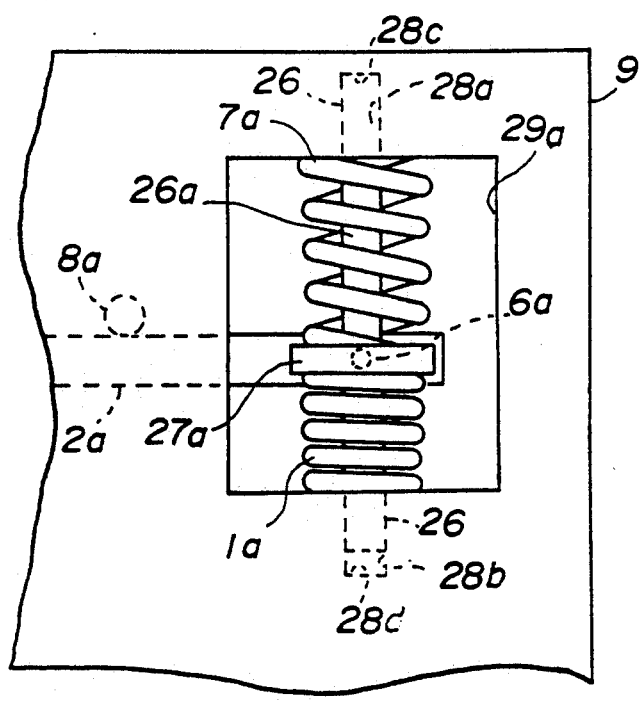
FIG. 6 shows a side view of the non-actuating driving means shown in FIG. 5.

FIG. 4 depicts heads 3a and 3b contacting the disk 10. The separating arms 2a and 2b have moved to the disk 10. As a result of the movement of the separating arms 2a and 2b, the pressing force applied to the gimbals 4a and 4b by means of the separating arms 2a and 2b is released. Thus, the gimbals 4a and 4b, which have been elastically defomred as mentioned above, are restored to their original state, and, as a result, the heads 3a and 3b come in contact with the disk 10. FIG. 6 shows a view in which the driving part of the separating arm 2a is enlarged in the direction C shown in FIG. 1. FIG. 3 shows a supporting member 9 for fixing one end of each of the separating arms 2a and 2b on the housing 11 of the magnetic disk storage unit. The separating arm 2a is supported pivotally around a pin 5a. One end of the separating arm 2a toward the supporting member 9, is fixed on the supporting member 9 while being held by the shape memory alloy spring 1a and a bias spring 7a which are connected to each other. Incidentally, each end of each of springs 1a and 7a opposite the disk member 27a of FIG. 5, is compressedly supported on a corresponding wall in a space 29. The other end of the separating arm 2a is engagable with the head 3a at a moving range of the arm 17 of the actuator 20. The separating arm 2b is constructed similaly to the separating arm 2a. That is, an end of it, toward the supporting member 9, is fixed on the supporting member 9 while being held by the shape memory alloy spring 1b and a bias spring 7b.

A heater 12 is provided, functioning as a heating means for heating the shape memory alloy springs 1a and 1b of the supporting member 9. The heater 12 is located so that it can heat both shape memory alloy springs 1a and 1b. The heater 12 is connected to a temperature control circuit 24 which controls flowing of electricity to the heater 12.

As shown in FIG. 5, a shaft 26 is inserted into the shape memory alloy spring 1a and the bias spring 7a, respectively. As mentioned above, the disk member 27 enclosed by the springs 1a and 7a is provided in the vicinity of the center of the shaft 26. The disk member 27 has a pin 6a in a direction perpendicular to the shaft 26 and the separating arm 2a. The pin 6a connects one end of the separating arm 2a to the disk member 27. The upper and lower ends of the shaft 26 are inserted into the respective bearings 28a and 28b provided in the space 29a. Since a span between the bottom parts 28c and 28d of the bearings 28a and 28b is longer than the shaft 26a, the shaft 26a can move upwardly and downwardly by the difference therebetween. When the shaft 26a dips and heaves, one end of the separating arm 2a dips and heaves, accordingly, and the separating pin 2a pivots around the pin 5a.

The supporting member 9 has a stopper 8a. When the shaft 26a heaves, the head 3a dips. When the head 3a contacts the disk 10, the separating arm 2a contacts the stopper 8a. Thus, the separating arm 2a is held at a predetermined position and compressed force is never applied to the disk 10 even when the head 3a contacts the disk 10; moreover, the head 3a floats slightly away from the disk as a result of the air flow generated by the high rotation speed of the disk 10.

FIG. 4 shows a stopper 8a in contact with the separating arm 2a. Incidentally, since the construction of the separating arm 2b is symmetrical to and substantially the same as that of the separating arm 2b via the disk 10, a description thereof will be omitted.

A description will now be given of the driving operation of the separating arm 2a with reference to FIGS. 5 and 6. In this embodiment, the shape memory alloy spring 1a made of the nickel-titanic alloy is used. The shape memory alloy is deformed in a predetermined shape, and kept for a predetermined period of time at a predetermined temperature higher than the normal temperature, to enable it to memorize the predetermined shape. The shape memory alloy spring 1a memorizes an elongated shape of spring. Hereupon, the shape memory alloy generally has a transition temperature or a transition point at which it deforms relatively remarkably. When the heater 12 is not electrified, the shape memory alloy spring 1a is not heated, and kept at a temperature less than the transition temperature. Since the shape memory alloy spring 1a shrinks at the normal temperature, its elastic recoil strength is relatively small. Therefore, the shape memory alloy spring 1a is downwardly compressed by the bias spring 7a, as shown in FIG. 5. On the other hand, when the heater 12 is electrified and thus the shape memory alloy spring 1a is heated to a temperature higher than the transition temperature, it deforms to the elongated shape and thus its elastic recoil strength increases. Thus, the shape memory alloy 1a upwardly compresses the bias spring 7a, as shown in FIG. 6. Then, when the heater 12 ceases to be electrified, and the temperature of the shape memory alloy spring 1a thus falls down below the transition temperature, the shape memory alloy is downwardly compressed again, as shown in FIG. 5. Since the disk member 27 heaves and dips with the springs 1a and 7a, the head shell 13a engaged with the separating arm 2a moves accordingly, and thus the head 3a mounted thereon separates or approaches the disk 10 accordingly.

The head shell 13a is fixed on the gimbal 4a so as to be parallel to the disk 10. Since the head shell 13a engages with the separating arm 2a near the head 3a, the head 3a moves more stably when the head shell 13a heaves and dips, than it moves with the conventional cramping mechanism. This applies to the lower head 3b and to the head shell 13b.

As mentioned above, the shape memory alloy spring 1a deforms in accordance with the transition temperature, and thus the separating arm 2a is driven. On the other hand, even if the magnetic disk storage unit ceases to be used, and thus the heater 12 ceases to be electrified, the temperature of the shape memory alloy spring 1a does not quickly drop to less than the transition temperature. Therefore, in this embodiment, after the heater 12 ceases to be electrified and a predetermined time has passed to enable to drop down the temperature of the shape memory alloy spring 1a to less than the transition temperature, the separation arm 2a is driven and the head 3a floats away from the disk 10. However, when the disk storage unit is used, and the temperature control circuit 24 electrifies the heater 12 so as to gradually heat the shape memory alloy spring 1a, the spindle motor 15 of the disk driving means is driven and the disk 10 starts to rotate. Since, at this time, the temperature of the shape memory alloy spring 1a does not reach the transition temperature, the head 3a remains to be separated from the disk 10. Then the temperature of the spring 1a reaches the transition temperature, and thus the head 3a approaches to the disk 10. This time the rotational frequency of the disk reaches a high speed of about 3000-3500 rpm generates an air flow on the surface of the disk 10; the head 3a starts to write data thereon or read data therefrom without contacting it. As mentioned above, according to this embodiment, the head can be stably floated away from the surface of the disk when the disk storage unit is not used, so that both adhesion and crashing phenomena never occur. In addition, since even if the disk 10 starts to rotate the temperature of the shape memory alloy spring 1a does not reach the transition temperature, the head 3a remains floating away from the disk 10. Thus, there is no friction between the disk 10 and the head 3a and thus a large torque is not needed for the spindle motor 15 to rotate the disk. Therefore, the motor provided can be small spindle motor 15, and the miniature disk storage unit can be made. Moreover, even if the sensorless motor inversely rotates, the disk 10 and the head 3a never get damaged.

In addition, since the shape memory alloy spring 1a deforms in accordance with the change of temperature, the head 3a slowly contacts the disk or floats therefrom only if the heater 12 is gradually electrified thus causing the temperature of the spring 1a to gradually change. Thus, no component of the head 3a is ever impacted and a miniature and inexpensive magnetic disk storage unit without a damper mechanism can be provided.

Incidentally, the lower separating arm 2b is symmetrical to the upper separating arm 2a via the disk 10, a description thereof will be omitted.

Figure 7:
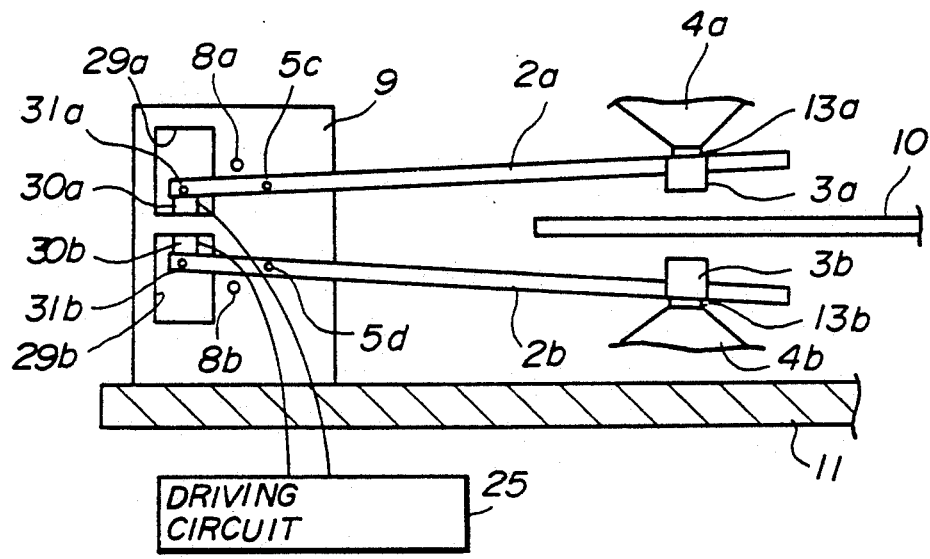
FIG. 7 shows a side view of the magnetic head separating mechanism of a second embodiment of the magnetic disk storage unit shown in FIG. 1.
Figure 8:
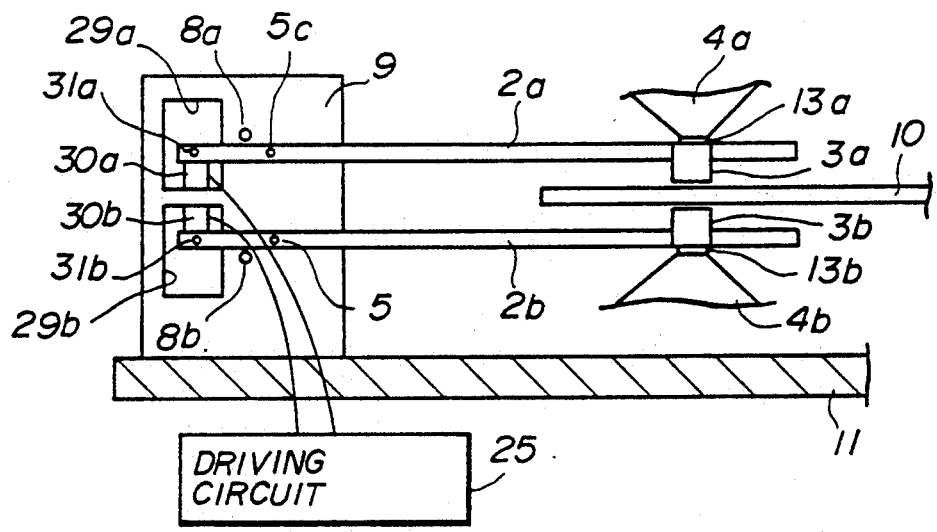
FIG. 8 shows a side view of the non-actuating magnetic head mechanism shown in FIG. 7.
Figure 9:
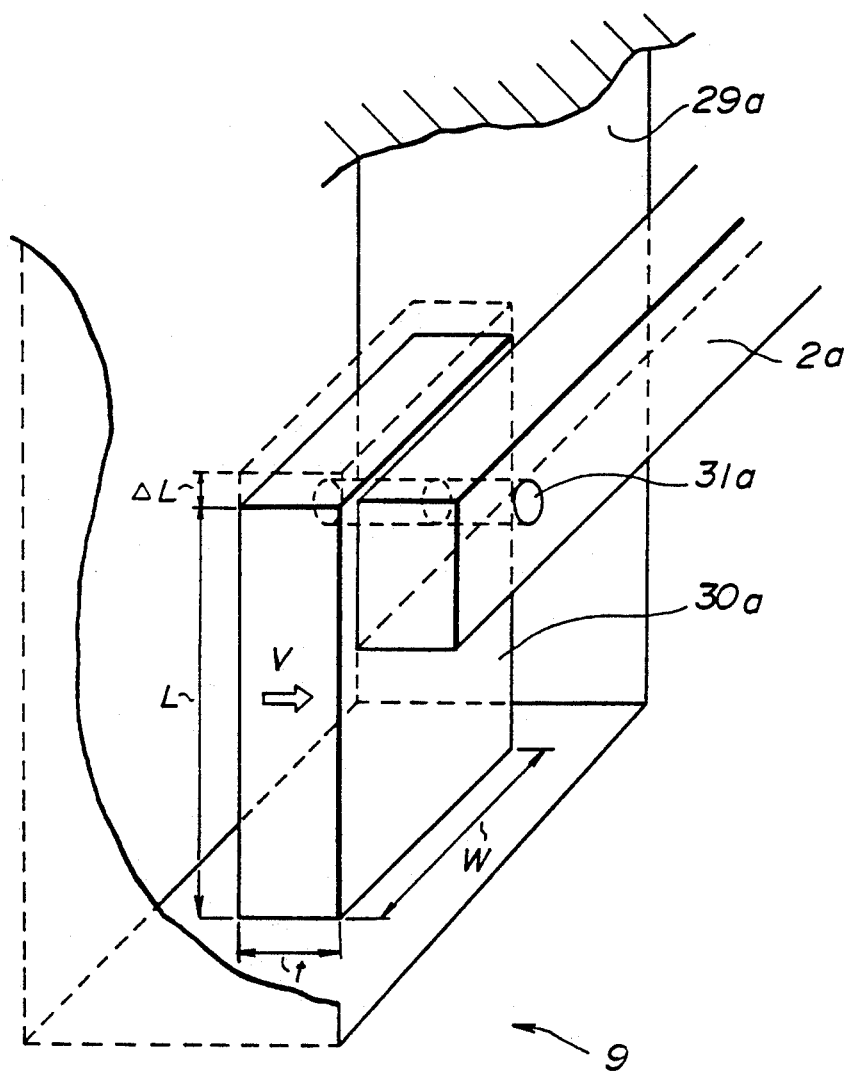
FIG. 9 shows a perspective view of the driving means of a third embodiment of the magnetic head separating mechanism shown in FIG. 7.

A description will now be given of the disk storage unit of another embodiment according to the present invention with reference to FIGS. 7 through 9. FIGS. 7 and 8, similarly to FIGS. 3 and 4, show views of the magnetic head separating mechanism of the head driving mechanism, as viewed from the direction B shown in FIG. 1. FIG. 7 shows a view in which the heads 3a and 3b are separated from the disk 10 through the separating arms 2a and 2b, which function as the head driving members. FIG. 8 shows a view in which the heads 3a and 3b are made to contact the disk 10 by the separating arms 2a and 2b which functions as the head driving members. FIG. 9 shows a perspective view magnifying the driving part of the separating arms 2a and 2b. In FIG. 7, the supporting member 9 to which the separating arm 2a is attached is provided on the housing 11. The supporting member 9 has space 29a and 29b.

A PZT2 piezoceramic 30a is attached to the the bottom of space 29a. A pin 31a is inserted into the upper end of the piezoceramic 30a to connect the piezoceramic 30a to one end of the separating arm 2a. The piezoceramic 30a is connected to driving circuit 25 as voltage applying means for applying an electric field. The rotating shaft, pin 5c, of the separating arm 2a is provided more adjacent to the center of the supporting member 9 than the pin 5a. Incidentally, since the magnetic head separating mechanism comprising the lower separating arm 2b is substantially the same as that of the magnetic head separating mechanism comprising the upper separating arm 2a, a description thereof will be omitted.

As shown in FIG. 9, the piezoceramic 30a has a parallelopiped shape having height L, width W and thickness t. As mentioned above, the pin 31a is inserted into the upper end of the piezoceramic 30a. THe pin 31a connects an approximate upper end of the piezoceramic 30a to one end of the separating arm 2a. In addition, the bottom of the piezoceramic 30a is fixed onto the bottom surface of the space 29a of the supporting member 9. Electrodes (not shown) are provided for the piezoceramic 30a. The driving circuit 25 applies voltage via the mentioned electrodes causing the piezoceramic 30a to generate an electric field in a direction V. The piezoceramic 30a then deforms and elongates by $\Delta L$. $\Delta L$ is given by the following equation (1).

$$\Delta L = (L/t) \cdot V \cdot d31 \qquad (1)$$

, wherein V is the voltage applied to the piezoceramic 30a and d31 is a piezo-deformation constant.

When the piezoceramic 30a elongates, the pin 31a is heaved a distance $\Delta L$ to pivot the separating arm 2a around the pin 5c. Since $\Delta L$ is made as large as possible by diminishing thickness t, which is the denominator of the above equation (1). In addition, a distance between the pin 5c and the piezoceramic 30a is made as small as possible in order to spread the elongation of the piezoceramic 30a to the head 3a based on the action of levers. As is clarified in the above equation (1), the elongation L is proportional to the applied voltage V. Accordingly, the elongation can be controlled by applying stepwise voltage from the driving circuit 25, thus moving the head 3a slowly without a damper mechanism or a electrical feed back control.

The voltage applied to the piezoceramic 30a is increased gradually when the disk 10 rotates at a speed high enough to generate an air flow, then the head 3a is made to approach the disk 10. As a result, the head 3a is moved, without contacting the disk 10, to a desired track on the disk to write data thereon or read data therefrom.

Incidentally, the operation of the lower separating arm 2b and the corresponding piezoceramic 30b is substantially the same as that of the upper separating arm 2a and the corresponding piezoceramic 30a, hence description thereof will be omitted.

As mentioned above, after the disk 10 starts to rotate and generate an air flow, the head driving means causes the heads 3a and 3b to approach the disk 10. However the heads 3a and 3b may be moved to the disk before the air flow is generated. In this case, although the heads 3a and 3b remain in contact with the disk 10 until the rotational frequency increases sufficiently, the adhesion phenomenon can be prevented and thus the disk 10 can be definitely rotated since the heads 3a and 3b are respectively separated from the disk 10 when the disk 10 starts to be rotated. In addition, since the heads 3a and 3b are respectively moved to the disk 10 after the rotational frequency of the disk more or less increases, the head crashing phenomenon generated by the inverse rotation of the sensorless spindle motor can be prevented. Moreover, a coefficient of kinetic friction between each of the heads 3a and 3b and the disk 10, after the disk 10 starts to rotate, is smaller than that of the static friction when the disk 10 stops rotating. Incidentally, this can be applied to the course from starting to stopping rotation of the disk 10.

Incidentally, the shape memory springs 1a and 1b may comprise a flat spring instead of the nickel-titanic alloy. Alternatively, copper or iron type shape memory alloy may be used. Further, an elongated or cylindrical piezoceramic may be used for the piezoceramic 30a and 30b instead of the RZT2 parallelopiped piezoceramic 30a and 30b. Optionally, titanic acid barium type piezoceramic may be used.

In summary, according to the present invention, since the heads 3a and 3b are respectively separated from the disk 10 while the disk storage unit is turned off, friction between each of the heads 3a and 3b and the disk 10 when the disk 10 starts to rotate can be reduced, and thus the head crashing phenomenon prevented. In addition, since the torque requisite for the spindle motor 15 can be diminished because of the reduced friction, a miniature, inexpensive spindle motor can be provided. Further, even if the sensorless spindle motor is used and it inversely rotates, the head crashing phenomenon can be prevented because of the small friction. Moreover, since the separating arms 2a and 2b are located near the heads 3a and 3b respectively, the heads 3a and 3b never shake when they come in contact with the disk and thus never damage the surface of the disk 10. In addition, since the temperature control circuit 24 controls the temperature of the heater 12 and the operation of the shape memory alloy 1a or the driving circuit 25 controls voltage to be applied to the piezoceramic 30a, the heads 3a and 3b move slowly without a complicated damper mechanism, and no component thereof is ever impacted. Thus, the life of each head can be made longer and an inexpensive and simply-constructed disk storage unit can be provided.

Further, the present invention is not limited to these preferred embodiments, but various variations and modifications may be made without departing from the scope of the present invention.

What is claimed is:

1. A disk storage unit comprising:
   a magnetic disk as a recording medium;
   a float type magnetic head which writes data on said magnetic disk and/or reads data therefrom;
   disk driving means for rotating said magnetic disk:
   a head driving member for driving said magnetic head; and
   a head driving mechanism for driving said head driving member in such a way that an action, by which said disk driving means starts driving said magnetic disk, causes an approaching force to be applied to said magnetic head directed toward said magnetic disk so as to move said magnetic head from a displaced position relative to said disk to an operational position for reading data from said disk and/or writing data thereto which position for reading/writing data said magnetic head reaches as a result of approaching said disk and in such a way that an action, by which said disk driving means stops driving said magnetic disk, causes a moving-away force to be applied to said magnetic head directed away from said magnetic disk, for moving said magnetic disk back to said displaced position.

2. A disk storage unit according to claim 1, wherein said head driving mechanism comprises:
   driving means comprising a shape memory alloy for driving said head driving member; and
   heating means for heating the driving means for a predetermined time, at predetermined times.

3. A disk storage unit according to claim 2, wherein said driving means comprises:
   a shape memory alloy spring comprising a shape memory alloy, one end of which is connected to one end of said head driving member;
   a bias spring, one end of which is connected to one end of the shape memory alloy spring; and
   a supporting member for supporting ends of the shape memory alloy spring and the bias spring.

4. A disk storage unit according to claim 2, wherein said heating means heats said driving means when said magnetic disk starts to rotate and stops heating said driving means when said magnetic disk stops rotating.

5. A disk storage unit according to claim 1, wherein said head driving mechanism comprises:
   piezoceramic driving means for driving said head driving member; and
   voltage applying means for applying voltage to said piezoceramic driving means for a predetermined time, at predetermined times.

6. A disk storage unit according to claim 5, wherein said voltage applying means applies voltage to said piezoceramic driving means when said magnetic disk starts to rotate and stops applying voltage to said piezoceramic driving means when said magnetic disk stops rotating.

7. A disk storage unit according to claim 1 further comprising: 'a gimbal comprising an elastic material for substantially supporting said float type magnetic head; and an actuator which moves said float type magnetic head via said gimbal in a radial direction of said magnetic disk, said head driving member substantially pressing said magnetic head and thus elastically deforming said gimbal so that said magnetic head can be separated from said magnetic disk while said magnetic disk stops rotating and said magnetic head can be made to approach said magnetic disk while said magnetic disk is rotating, said head driving member being located so that said head driving member can substantially press said magnetic head even when said magnetic head is moved by said actuator thus changing the position of said magnetic head on said magnetic disk.

8. A disk storage unit according to claim 1, wherein said head driving mechanism controls the movement of said magnetic head so that said magnetic head starts to approach toward said magnetic disks after certain period of time has elapsed since said disk driving means begins to rotate said magnetic disk as to rotate said magnetic disk.

9. A disk storage unit according to claim 1, further comprising an actuator arm pivotably supported in said disk storage unit, said magnetic head being attached on an end of said actuator arm, said actuator arm being pivoted so that said magnetic head moves in a radial direction of said magnetic disk;
wherein:
said head driving member extends in a direction substantially perpendicular to a direction in which said actuator arm extends; and
said head driving mechanism presses said head driving member so as to cause said head driving member to press said actuator arm so that said head driving member applies said approaching and moving-away forces to said magnetic head.

10. A disk storage unit comprising:
a magnetic disk as a recording medium;
a float type magnetic head which writes data on said magnetic disk and/or reads data therefrom;
disk driving means for rotating said magnetic disk;
a head driving member for driving said magnetic head so that said magnetic head can be separated from said magnetic disk while said magnetic disk is not rotating, and so that said magnetic head can be made to approach said magnetic disk while said magnetic disk is rotating; and
a head driving mechanism for driving said head driving member; and
wherein:
said head driving mechanism comprises:
piezoceramic driving means for driving said head driving member; and
voltage applying means for applying, at predetermined times, voltage to said piezoceramic driving means for a predetermined time period;
said voltage applying means applying voltage to said piezoceramic driving means when said magnetic disk starts to rotate and not applying voltage to said piezoceramic driving means when said magnetic disk stops rotating.

11. A disk storage unit comprising:
a magnetic disk acting as a recording medium;
a float type magnetic head which writes data on said magnetic disk and/or reads data therefrom;
disk driving means for rotating said magnetic disk;
a head driving member for driving said magnetic head so that said magnetic head can be separated from said magnetic disk while said magnetic disk is not rotating, and so that said magnetic head can be made to approach said magnetic disk while said magnetic disk is rotating; and
a head driving mechanism for driving said head driving member;
a gimbal comprising an elastic material for substantially supporting said float type magnetic head and an actuator which moves said float type magnetic head via said gimbal in a radial direction of said magnetic disk, said head driving member substantially pressing said magnetic head and thus elastically deforming said gimbal so that said magnetic head can be separated from said magnetic disk while said magnetic disk is not rotating, and so that said magnetic head can be made to approach said magnetic disk while said magnetic disk is rotating, said head driving member being located so that said head driving member can substantially press said magnetic head even when said magnetic head is moved by said actuator to change the position of said magnetic head on said magnetic disk.

12. A disk storage unit according to claim 1, further comprising a head approaching mechanism for constantly applying a constant approaching force to said magnetic head, said constant approaching force comprising a force directed toward said magnetic disk, and wherein said head driving mechanism drives said head driving member in such a way that an action, by which said disk driving means starts driving said magnetic disk, causes said head driving member not to apply any force to said magnetic head, and an action, by which said disk driving means stops driving said magnetic disk, causes said head driving member to apply a variable moving-away force to said magnetic head so that a moving-away force comprising a force directed away from said magnetic disk can be applied to said magnetic head as a result of said variable moving-away force overcoming said constant approaching force.

* * * * *